(12) United States Patent
Kishimoto et al.

(10) Patent No.: US 11,947,926 B2
(45) Date of Patent: Apr. 2, 2024

(54) DISCOURSE-LEVEL TEXT OPTIMIZATION BASED ON ARTIFICIAL INTELLIGENCE PLANNING

(71) Applicant: International Business Machines Corporation, Armonk, NY (US)

(72) Inventors: Akihiro Kishimoto, Castleknock (IE); Beat Buesser, Ashtown (IE); Bei Chen, Blanchardstown (IE); Yufang Hou, Dublin (IE)

(73) Assignee: International Business Machines Corporation, Armonk, NY (US)

( * ) Notice: Subject to any disclaimer, the term of this patent is extended or adjusted under 35 U.S.C. 154(b) by 505 days.

(21) Appl. No.: 17/032,264

(22) Filed: Sep. 25, 2020

(65) Prior Publication Data

US 2022/0100969 A1 Mar. 31, 2022

(51) Int. Cl.
*G06F 40/58* (2020.01)
*G06F 40/263* (2020.01)
*G06N 5/01* (2023.01)

(52) U.S. Cl.
CPC .......... *G06F 40/58* (2020.01); *G06F 40/263* (2020.01); *G06N 5/01* (2023.01)

(58) Field of Classification Search
CPC .... G06F 40/211; G06F 40/253; G06F 40/268; G06F 40/284; G06F 40/30
See application file for complete search history.

(56) References Cited

U.S. PATENT DOCUMENTS

| | | | |
|---|---|---|---|
| 6,684,201 B1 * | 1/2004 | Brill | G06F 40/30 |
| | | | 706/45 |
| 6,866,510 B2 | 3/2005 | Polanyi et al. | |
| 7,231,341 B2 | 6/2007 | Bangalore et al. | |
| 7,403,890 B2 | 7/2008 | Roushar | |
| 7,536,295 B2 | 5/2009 | Cancedda et al. | |
| 8,019,610 B2 | 9/2011 | Walker et al. | |
| 8,027,945 B1 | 9/2011 | Elad et al. | |
| 8,886,515 B2 * | 11/2014 | Van Assche | G06F 40/47 |
| | | | 704/4 |
| 9,710,429 B1 * | 7/2017 | Raghunath | G06F 40/00 |
| 9,916,304 B2 | 3/2018 | Fujiwara et al. | |
| 10,331,793 B2 | 6/2019 | Potterer | |
| 2007/0282594 A1 | 12/2007 | Spina | |

(Continued)

FOREIGN PATENT DOCUMENTS

EP 1363200 A2 11/2003

OTHER PUBLICATIONS

"GPT-2: 1.5B Release", Open AI Blog, Nov. 5, 2019, Printed Sep. 21, 2020, 4 pages, <https://openai.com/blog/gpt-2-1-5b-release/>.

(Continued)

*Primary Examiner* — Lamont M Spooner
(74) *Attorney, Agent, or Firm* — Haley J. McClory

(57) ABSTRACT

In an approach for discourse-level text optimization, a processor receives an initial text in a first language. A processor applies one or more operators to modify the initial text. A processor evaluates the modified text using a scoring function. A processor determines whether a score generated from the scoring function on the modified text is above a predefined threshold. In response to determining the score is above the predefined threshold, a processor outputs the modified text.

20 Claims, 5 Drawing Sheets

(56) References Cited

U.S. PATENT DOCUMENTS

| | | | | |
|---|---|---|---|---|
| 2008/0270119 | A1* | 10/2008 | Suzuki | G06F 40/56 704/9 |
| 2009/0292677 | A1* | 11/2009 | Kim | G06F 16/958 |
| 2010/0100371 | A1 | 4/2010 | Yuezhong et al. | |
| 2010/0145902 | A1* | 6/2010 | Boyan | G06F 16/958 715/810 |
| 2011/0022583 | A1* | 1/2011 | Pennell, Sr. | G06F 16/24542 707/718 |
| 2011/0046941 | A1 | 2/2011 | Johnson | |
| 2011/0307244 | A1* | 12/2011 | He | G06F 40/45 704/4 |
| 2013/0103390 | A1 | 4/2013 | Fujita | |
| 2013/0268260 | A1* | 10/2013 | Lundberg | G06F 11/3664 704/8 |
| 2014/0244240 | A1* | 8/2014 | Kim | G06F 16/345 704/9 |
| 2014/0324883 | A1* | 10/2014 | Deolalikar | G06F 16/345 707/748 |
| 2017/0075877 | A1* | 3/2017 | Lepeltier | G06F 40/117 |
| 2018/0285326 | A1* | 10/2018 | Goyal | G06F 40/197 |
| 2018/0373691 | A1* | 12/2018 | Alba | G06F 40/166 |
| 2019/0065462 | A1* | 2/2019 | Salloum | G06F 40/44 |
| 2020/0151219 | A1 | 5/2020 | Anand et al. | |
| 2020/0175393 | A1* | 6/2020 | Gee | G06N 3/08 |
| 2020/0387678 | A1* | 12/2020 | Hara | G06F 40/166 |
| 2021/0019371 | A1* | 1/2021 | Saha | G06F 40/30 |
| 2021/0049019 | A1* | 2/2021 | Agarwal | G06N 20/00 |
| 2021/0103610 | A1* | 4/2021 | Lee | G06F 18/24 |
| 2022/0028002 | A1* | 1/2022 | Kožely | G06F 9/451 |
| 2022/0050968 | A1* | 2/2022 | Xie | H04L 51/02 |
| 2022/0067071 | A1* | 3/2022 | Romm | G06F 16/906 |
| 2022/0309416 | A1* | 9/2022 | Barday | G06Q 10/067 |

OTHER PUBLICATIONS

"Great Writing, Simplified", Grammerly Free Online Writing Assistant, Printed Sep. 21, 2020, 1 page, <https://www.grammarly.com/>.

"Welcome to Moses", MOSES—statistical machine translation system, Printed Sep. 21, 2020, 3 pages, <http://www.statmt.org/moses/>.

Drid, Thouria, "Discourse Analysis: Key Concepts and Perspectives", University of Ouargla, 2010, 7 pages, <https://www.researchgate.net/publication/282184078_DISCOURSE_ANALYSIS_KEY_CONCEPTS_AND_PERSPECTIVES/link/5606951608aeb5718ff4680f/download>.

Hardmeier, Christian, "Discourse in Statistical Machine Translation", Studia Linguistica Upsaliensia 15, Uppsala: Acta Universitatis Upsaliensis, 2014, ISBN 978-91-554-8963-2, 186 pages.

Ke et al., "Automated Essay Scoring: A Survey of the State of the Art", Proceedings of the Twenty-Eighth International Joint Conference on Artificial Intelligence (IJCAI-19), Aug. 10-16, 2019, Macao, 9 pages, <https://www.ijcai.org/Proceedings/2019/0879.pdf>.

Koller et al., "Sentence generation as a planning problem", Proceedings of the 45th Annual Meeting of the Association for Computational Linguistics (ACL 2007), Jun. 23-30, 2007, Prague, Czech Republic, 8 pages, <https://www.cs.rutgers.edu/~mdstone/pubs/acl07.pdf>.

Maruf et al., "Selective Attention for Context-aware Neural Machine Translation", Proceedings of the 2019 Conference of the North American Chapter of the Association for Computational Linguistics: Human Language Technologies, vol. 1 (Long and Short Papers), Jun. 2019, Minneapolis, Minnesota, 11 pages.

Miculicich et al., "Document Level Neural Machine Translation with Hierarchical Attention Networks", Proceedings of the 2018 Conference on Empirical Methods in Natural Language Processing, Oct.-Nov. 2018, Brussels, Belgium, 8 pages.

Tiedemann et al., "Neural Machine Translation with Extended Context", Proceedings of the Third Workshop on Discourse in Machine Translation, Sep. 2017, Copenhagen, Denmark, 11 pages.

* cited by examiner

DISCOURSE-LEVEL TEXT OPTIMIZATION BASED ON ARTIFICIAL INTELLIGENCE PLANNING

BACKGROUND

The present disclosure relates generally to the field of natural language processing and translation, and more particularly to discourse-level text optimization based on artificial intelligence planning.

Natural language processing is a subfield of linguistics, computer science, and artificial intelligence concerned with the interactions between computers and human language, in particular how to program computers to process and analyze large amounts of natural language data. Challenges in natural language processing frequently involve speech recognition, natural language understanding, and natural language generation. Machine translation is the task of automatically converting one natural language into another, preserving the meaning of the input text, and producing fluent text in the output language.

SUMMARY

Aspects of an embodiment of the present disclosure disclose an approach for discourse-level text optimization. A processor receives an initial text in a first language. A processor applies one or more operators to modify the initial text. A processor evaluates the modified text using a scoring function. A processor determines whether a score generated from the scoring function on the modified text is above a predefined threshold. In response to determining the score is above the predefined threshold, a processor outputs the modified text.

DETAILED DESCRIPTION

The present disclosure is directed to systems and methods for discourse-level text optimization based on artificial intelligence planning.

Embodiments of the present disclosure recognize a need for text optimization by adding more sentences for clearer explanation, removing sentences which include redundant explanation, re-ordering sentences for a better structure, and paraphrasing sentences in a text. Embodiments of the present disclosure recognize a need for post-editing a translated text. Embodiments of the present disclosure disclose optimizing a translation using planning operators at a discourse level. Embodiments of the present disclosure disclose performing a post-processing step for a discourse-level machine translation. Embodiments of the present disclosure disclose improving the quality of translations by applying the planning operators to the text. Embodiments of the present disclosure disclose returning an optimized text in a target language.

Figure 1:
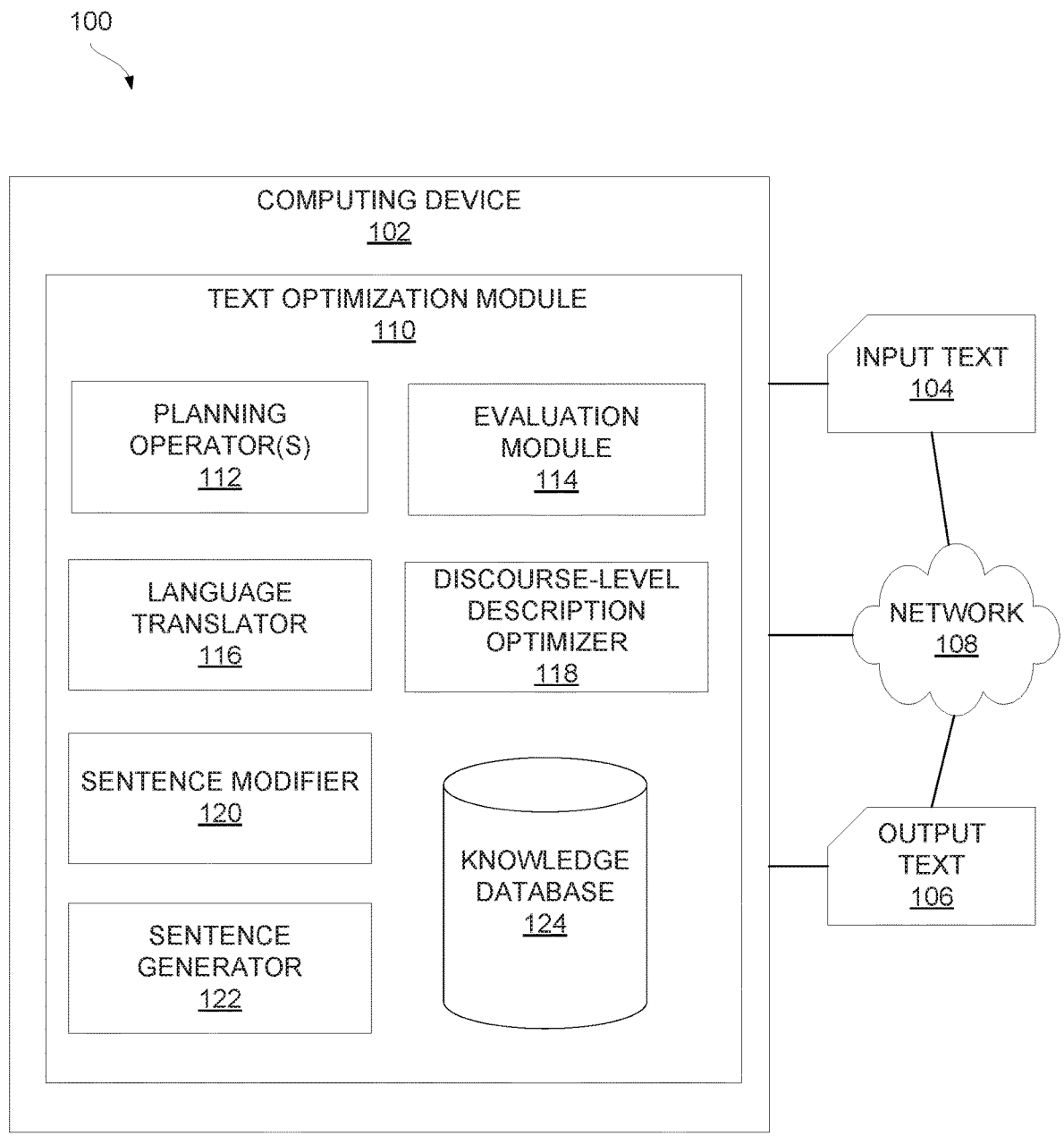
FIG. 1 is a functional block diagram illustrating a text optimization environment, in accordance with an embodiment of the present disclosure.

The present disclosure will now be described in detail with reference to the Figures. FIG. 1 is a functional block diagram illustrating a text optimization environment, generally designated 100, in accordance with an embodiment of the present disclosure.

In the depicted embodiment, text optimization environment 100 includes computing device 102, input text 104, output text 106, and network 108. In one or more embodiments, input text 104 may be an initial text including one or more sentences in a natural language. For example, input text 104 can be written in English, or any other natural languages. Input text 104 can be a written paper, article, report, text message, or any other suitable written text. Input text 104 can be accessed directly by computing device 102 or accessed through a communication network such as network 108. In one or more embodiments, output text 106 may be optimized text of input text 104 by using text optimization module 110. Output text 106 may be in a target language which can be in a same language of input text 104. In another example, output text 106 may be in a different language from input text 104. Output text 104 can be output directly by computing device 102 or output through a communication network such as network 108. In the depicted embodiment, input text 104 and output text 106 are located externally outside computing device 102. However, in other embodiments, input text 104 and output text 106 may be located and saved on computing device 102.

In various embodiments of the present disclosure, computing device 102 can be a laptop computer, a tablet computer, a netbook computer, a personal computer (PC), a desktop computer, a mobile phone, a smartphone, a smart watch, a wearable computing device, a personal digital assistant (PDA), or a server. In another embodiment, computing device 102 represents a computing system utilizing clustered computers and components to act as a single pool of seamless resources. In other embodiments, computing device 102 may represent a server computing system utilizing multiple computers as a server system, such as in a cloud computing environment. In general, computing device 102 can be any computing device or a combination of devices with access to text optimization module 110 and network 108 and is capable of processing program instructions and executing text optimization module 110, in accordance with an embodiment of the present disclosure. Computing device 102 may include internal and external hardware components, as depicted and described in further detail with respect to FIG. 5.

Further, in the depicted embodiment, computing device 102 includes text optimization module 110. In the depicted embodiment, text optimization module 110 is located on computing device 102. However, in other embodiments, text optimization module 110 may be located externally and accessed through a communication network such as network 108. The communication network can be, for example, a local area network (LAN), a wide area network (WAN) such as the Internet, or a combination of the two, and may include wired, wireless, fiber optic or any other connection known in the art. In general, the communication network can be any combination of connections and protocols that will support communications between computing device 102 and text optimization module 110, in accordance with a desired embodiment of the disclosure.

In the depicted embodiment, text optimization module 110 includes planning operator(s) 112, evaluation module 114, language translator 116, discourse-level description optimizer 118, sentence modifier 120, sentence generator 122, and knowledge database 124. In the depicted embodiment, planning operator(s) 112, evaluation module 114, language translator 116, discourse-level description optimizer 118, sentence modifier 120, sentence generator 122, and knowledge database 124 are located on text optimization module 110 and computing device 102. However, in other embodiments, planning operator(s) 112, evaluation module 114, language translator 116, discourse-level description optimizer 118, sentence modifier 120, sentence generator 122, and knowledge database 124 may be located externally and accessed through a communication network such as network 108.

In one or more embodiments, text optimization module 110 is configured to receive input text 104 in a natural language. Input text 104 may include multiple sentences written in a natural language. Text optimization module 110 may translate input text 104 into a different language using a sentence-level translation engine, e.g., language translator 116. Text optimization module 110 may translate input text 104 by using a phrase-based translator. Text optimization module 110 may translate input text 104 sentence by sentence. Text optimization module 110 may generate a new sentence in input text 104. For example, text optimization module 110 may find a single/plural of relevant keywords from knowledge database 124 and pass the keywords to a language model for sentence generation. Knowledge database 124 can be structured and/or unstructured existing documents (e.g., academic papers, documents from the Internet). Text optimization module 110 may paraphrase a sentence in input text 104. For example, text optimization module 110 may modify the sentence through a writing tool using artificial intelligence and natural language processing.

In one or more embodiments, text optimization module 110 is configured to apply planning operators 112 to modify input text 104. Planning operators 112 may be a set of predefined planning operations to perform in input text 104. Planning operators 112 may define swapping, adding, removing, paraphrasing, or other operations in a sentence level for input text 104. For example, planning operator 112 (e.g., Swap L1 L2) may indicate to swap sentences S1 and S2, located at L1 and L2, respectively. Planning operator 112 (e.g., Add S L) may indicate to insert new sentence S in location L. Planning operator 112 may remove a sentence. Planning operator 112 may paraphrase a sentence.

Text optimization module 110 may apply a heuristic search to find a sequence of planning operators 112 applied to input text 104 for a new text which returns a better score according to a scoring function. In an example, the heuristic search may refer to a search strategy that attempts to optimize a problem by iteratively improving the solution based on a given heuristic function or a cost measure. The heuristic search can be a technique designed for solving a problem more quickly when classic methods are too slow, or for finding an approximate solution when classic methods fail to find any exact solution. The heuristic search can trade optimality, completeness, accuracy, or precision for speed. The heuristic search may rank alternatives in search algorithms at each branching step based on available information to decide which branch to follow. The heuristic search may approximate an exact solution.

Text optimization module 110 may apply an iterative deepening depth-first search based on the sequence of planning operators 112. In an example, the iterative deepening depth-first search may be a state space/graph search strategy in which a depth-limited version of depth-first search is run repeatedly with increasing depth limits until the goal is found. The iterative deepening depth-first search is optimal and may use less memory. In an example, text optimization module 110 may iteratively apply planning operators 112 to modify input text 104.

Text optimization module 110 may interleave performing a planning operation (by planning operators 112) and iterative deepening depth-first search. For example, text optimization module 110 may receive input text 104 as an initial text. Text optimization module 110 may determine the number of planning operators 112. For the purpose of illustration, the number of planning operators 112 may be denoted as N. The search space may be denoted as T. T may be in a range between 1 and N. Text optimization module 110 may start the iterative deepening depth-first search with a search space (e.g., T=1), which means to perform one planning operation applying each one of planning operators 112 to the initial text. Text optimization module 110 may find a candidate text after the planning operation by applying each one of planning operators 112 to modify the initial text. Text optimization module 110 may score the candidate text using a scoring function from evaluation module 114. Text optimization module 110 may determine whether the candidate text has a better score according to the scoring function. If text optimization module 110 determines that the candidate text has a better score than the initial text, text optimization module 110 may replace the initial text with the candidate text and repeat applying each one of planning operators 112 to modify the candidate text. If no better text is found in the search space (i.e., T=1), text optimization module 110 may increment T from 1 to 2 and apply T (i.e., T=2) planning operations based on planning operators 112 and repeat till finding a new better candidate text. Text optimization module 110 may repeat till T reaching to the maximum search space (i.e., N) and find the best candidate text based on the best score from a scoring function in evaluation module 114. Text optimization module 110 may output the best candidate text as output text 106.

In one or more embodiments, text optimization module 110 may efficiently perform anytime (or real-time) heuristic search which can be terminated per a user request. For example, the heuristic search may be terminated when a predefined threshold is met. The threshold can be predefined as a runtime of the iterative deepening depth-first search, a maximum number of the planning operators applied to input text 104, and or a predefined score of a target text (e.g., output text 106).

In one or more embodiments, text optimization module 110 is configured to evaluate a modified text of input text 104 using a scoring function. Text optimization module 110 may generate the modified text based on applying planning operators 112. Text optimization module 110 may evaluate the quality of the modified text of input text 104. Text optimization module 110 may evaluate the quality of the description of the modified text. Text optimization module 110 may generate a score for the modified text. The higher score indicates the better quality the modified text has. Text optimization module 110 may iteratively evaluate the modified text based on the iteratively applied planning operators 112 respectively.

In one or more embodiments, text optimization module 110 is configured to determine whether a score generated from the scoring function on the modified text is above a predefined threshold. In response to determining the score is above the predefined threshold, text optimization module 110 may output the modified text as output text 106.

In one or more embodiments, planning operator(s) 112 may be a set of predefined planning operations to perform in input text 104. Planning operators 112 may define swapping, adding, removing, paraphrasing, or other operations in a sentence level for input text 104. Planning operators 112 may indicate which sentence should be removed, paraphrased, and added in a sentence level. For example, planning operator 112 (e.g., Swap L1 L2) may indicate to swap sentences S1 and S2, located at L1 and L2, respectively. Planning operator 112 (e.g., Add S L) may indicate to insert new sentence S in location L. Planning operator 112 may remove a sentence. Planning operator 112 may paraphrase a sentence. Planning operator 112 may perform other suitable operation on a text, e.g., input text 104 and any further modified text based on input text 104.

In one or more embodiments, evaluation module 114 is configured to evaluate a text, e.g., input text 104, any further modified text based on input text 104, and output text 104. Evaluation module 114 may evaluate the text using a scoring function and generating a score for the text. In general, a higher score indicates a better quality of the text. Evaluation module 114 may evaluate the quality of the text, for example, by evaluating a description of the text. Text optimization module 110 may generate a score for the evaluated text. Evaluation module 114 may iteratively evaluate the modified text based on the iteratively applied planning operators 112 respectively. Evaluation module 114 may embody a scoring function by an automated essay scoring. Evaluation module 114 may evaluate the text in term of the text's structure. Evaluation module 114 may receive feedback from an end user and use the feedback to influence the output (e.g., a user can assign more weights on some examples and generate more facts from knowledge database 124).

In one or more embodiments, language translator 116 is configured to translate a text in a natural language into a different language. In an example, language translator 116 may be a sentence-level natural language processing translation engine to translate input text 104 into a different natural language. In an example, language translator 116 may translate a text sentence by sentence. In another example, language translator 116 may be a phrase-based translator.

In one or more embodiments, sentence modifier 120 is configured to modify a sentence in a text, e.g., input text 104. Sentence modifier 120 may paraphrase a sentence in input text 104. For example, sentence modifier 120 may modify the sentence through a writing tool using artificial intelligence and natural language processing techniques. Sentence modifier 120 may modify a sentence based on knowledge database 124.

In one or more embodiments, sentence generator 122 is configured to generate a new sentence. In an example, sentence generator 122 may generate a new sentence in input text 104. Sentence generator 122 may generate a new sentence in any further modified text based on input text 104. Sentence generator 122 may generated a new sentence based on knowledge database 124. For example, sentence generator 122 may find a single/plural of relevant keywords from knowledge database 124 and pass the keywords to a language model for a sentence generation. Sentence generator 122 may insert a new sentence in input text 104 based on applying planning operator 112 (e.g., Add S L).

In one or more embodiments, knowledge database 124 may be structured and/or unstructured existing documents (e.g., academic papers, documents from the Internet). Sentence generator 122 may generated a new sentence based on knowledge database 124. Sentence modifier 120 may paraphrase a sentence based on knowledge database 124.

In one or more embodiments, discourse-level description optimizer 118 is configured to apply a heuristic search to find a sequence of planning operators 112 applied to input text 104 for a new text which returns a better score according to a scoring function. Discourse-level description optimizer 118 may optimize a description by using a single/plural of planning operations for modifying the text and a scoring function for evaluating the text. For example, a discourse-level view of language takes discourse as the primary unit of analysis. Discourse may be the way that language is used to construct connected and meaningful texts, either spoken or written. Discourse is a view of language, therefore, that extends beyond the sentence. Planning operators 112 may define the search space of finding an optimized text. Discourse-level description optimizer 118 may interleave planning execution and iterative deepening depth-first search that can efficiently perform anytime (or real-time) heuristic search.

In one or more embodiments, discourse-level description optimizer 118 is configured to apply planning operators 112 to modify input text 104. Planning operators 112 may be a set of predefined planning operations to perform in input text 104. Planning operators 112 may define swapping, adding, removing, paraphrasing, or other operations in a sentence level for input text 104. For example, planning operator 112 (e.g., Swap L1 L2) may indicate to swap sentences S1 and S2, located at L1 and L2, respectively. Planning operator 112 (e.g., Add S L) may indicate to insert new sentence S in location L. Planning operator 112 may remove a sentence. Planning operator 112 may paraphrase a sentence. Discourse-level description optimizer 118 may apply a heuristic search to find a sequence of planning operators 112 applied to input text 104 for a new text which returns a better score according to a scoring function. Discourse-level description optimizer 118 may apply an iterative deepening depth-first search based on the sequence of planning operators 112. Discourse-level description optimizer 118 may iteratively apply planning operators 112 to modify input text 104. Discourse-level description optimizer 118 may interleave performing a planning operation (by planning operators 112) and iterative deepening depth-first search. For example, discourse-level description optimizer 118 may receive input text 104 as an initial text. Discourse-level description optimizer 118 may determine the number of planning operators 112. For the purpose of illustration, the number of planning operators 112 may be denoted as N. The search space may be denoted as T. T may be in a range between 1 and N. Discourse-level description optimizer 118 may start the iterative deepening depth-first search with a search space (e.g., T=1), which means to perform one planning operation applying each one of planning operators 112 to the initial text. Discourse-level description optimizer 118 may find a candidate text after the planning operation by applying each one of planning operators 112 to modify the initial text. Discourse-level description optimizer 118 may score the candidate text using a scoring function from evaluation module 114. Discourse-level description optimizer 118 may determine whether the candidate text has a better score according to the scoring function. If discourse-level description optimizer 118 determines that the candidate text has a better score than the initial text, discourse-level description optimizer 118 may replace the initial text with the candidate text and repeat applying each one of planning operators 112 to modify the candidate text. If no better text is found in the search space (i.e., T=1), discourse-level description optimizer 118 may increment T from 1 to 2 and apply T (i.e., T=2) planning operations based on planning operators 112 and repeat till finding a new better candidate text. Discourse-level description optimizer 118 may repeat till T reaching to the maximum search space (i.e., N) and find the best candidate text based on the best score from a scoring function in evaluation module 114. Discourse-level description optimizer 118 may output the best candidate text as output text 106. In one or more embodiments, discourse-level description optimizer 118 may efficiently perform anytime (or real-time) heuristic search which can be terminated whenever a user wants. For example, the heuristic search may be terminated when a predefined threshold is met. The threshold can be predefined as a runtime of the iterative deepening depth-first search, a maximum number of the planning operators applied to input text 104, and a predefined score of a target text (e.g., output text 106). In an example, a sequence of planning operators 112 can lead to generating an identical or similar text, for example, deleting one sentence from the initial text and then adding the same/similar sentence again. Discourse-level description optimizer 118 may eventually find an optimized text even if these repeated/similar documents are generated. Discourse-level description optimizer 118 may use a hash table (or transposition table) storing the examined states and detecting duplicate states.

In one or more embodiments, discourse-level description optimizer 118 is configured to optimize a translation using planning operators 112 at the discourse level. Discourse-level description optimizer 118 may re-order sentences to a more reasonable and convincing order. Discourse-level description optimizer 118 may remove sentences including redundant information. Discourse-level description optimizer 118 may add detailed sentences/contents to clarify information uncommon to a reader. Discourse-level description optimizer 118 may paraphrase sentences to be more understandable and effective. Discourse-level description optimizer 118 may perform a post-processing step for discourse-level machine translation. Discourse-level description optimizer 118 may optimize input text 104 in a structured way. Discourse-level description optimizer 118 may add words and sentences which are not present in the initial description of input text 104. Discourse-level description optimizer 118 may define the optimization task as a discourse-level planning task by defining planning operators 112. Discourse-level description optimizer 118 may improve the quality of translations by applying planning operators 112 to input text 104 and further modified text in a description level. Discourse-level description optimizer 118 may use a combination of plan execution and search. Discourse-level description optimizer 118 may terminate the plan execution and search per a predefined threshold at any time per a user. After receiving an initial text, a set of predefined operators, a scoring function and commonsense knowledge database as input, discourse-level description optimizer 118 may return an optimized text in a target language.

Figure 2:
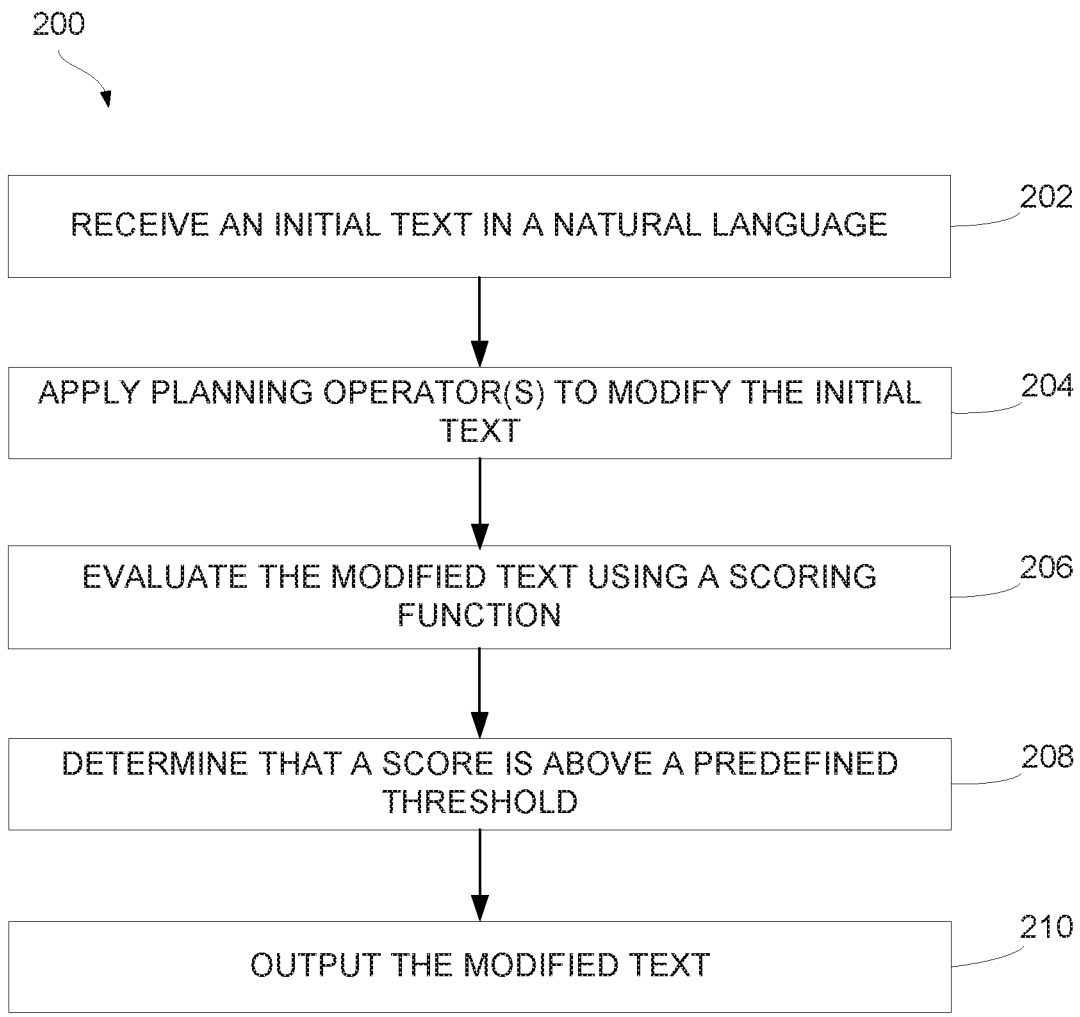
FIG. 2 is a flowchart depicting operational steps of a text optimization module within a computing device of FIG. 1, in accordance with an embodiment of the present disclosure.

FIG. 2 is a flowchart 200 depicting operational steps of text optimization module 110 in accordance with an embodiment of the present disclosure.

Text optimization module 110 operates to receive input text 104 in a natural language. Text optimization module 110 also operates to apply planning operators 112 to modify input text 104. Text optimization module 110 operates to evaluate a modified text of input text 104 using a scoring function. Text optimization module 110 operates to determine that a score generated from the scoring function on the modified text is above a predefined threshold. Text optimization module 110 operates to output the modified text as output text 106.

In step 202, text optimization module 110 receives input text 104 in a natural language. Input text 104 may include multiple sentences written in a natural language. Text optimization module 110 may translate input text 104 into a different language using a sentence-level translation engine, e.g., language translator 116. Text optimization module 110 may translate input text 104 by using a phrase-based translator. Text optimization module 110 may translate input text 104 sentence by sentence. Text optimization module 110 may generate a new sentence in input text 104. For example, text optimization module 110 may find a single/plural of relevant keywords from knowledge database 124 and pass the keywords to a language model for sentence generation. Knowledge database 124 may include structured and unstructured documents (e.g., academic papers, documents from the Internet). Text optimization module 110 may paraphrase a sentence in input text 104. For example, text optimization module 110 may modify the sentence through a writing tool using artificial intelligence and natural language processing techniques.

In step 204, text optimization module 110 applies planning operators 112 to modify input text 104. Planning operators 112 may be a set of predefined planning operations to perform in input text 104. Planning operators 112 may define swapping, adding, removing, paraphrasing, or other operations in a sentence level for input text 104. For example, planning operator 112 (e.g., Swap L1 L2) may indicate to swap sentences S1 and S2, located at L1 and L2, respectively. Planning operator 112 (e.g., Add S L) may indicate to insert new sentence S in location L. Planning operator 112 may remove a sentence. Planning operator 112 may paraphrase a sentence.

Text optimization module 110 may apply a heuristic search to find a sequence of planning operators 112 applied to input text 104 for a new text which returns a better score according to a scoring function. In an example, the heuristic search may refer to a search strategy that attempts to optimize a problem by iteratively improving the solution based on a given heuristic function or a cost measure, e.g., a scoring function in evaluation module 114. The heuristic search can be a technique designed for solving a problem more quickly when classic methods are too slow, or for finding an approximate solution when classic methods fail to find any exact solution. The heuristic search can trade optimality, completeness, accuracy, or precision for speed. The heuristic search may rank alternatives in search algorithms at each branching step based on available information to decide which branch to follow. The heuristic search may approximate an exact solution.

Text optimization module 110 may apply an iterative deepening depth-first search based on the sequence of planning operators 112. In an example, the iterative deepening depth-first search may be a state space/graph search strategy in which a depth-limited version of depth-first search is run repeatedly with increasing depth limits until the goal is found. The iterative deepening depth-first search may use much less memory. At each iteration, the iterative deepening depth-first search may visit the nodes in the search tree in the same order as depth-first search, but the cumulative order in which nodes are first visited is effectively breadth-first. For example, text optimization module 110 may iteratively apply planning operators 112 to modify input text 104.

Text optimization module 110 may interleave performing a planning operation (by planning operators 112) and iterative deepening depth-first search. For example, text optimization module 110 may receive input text 104 as an initial text. Text optimization module 110 may determine the number of planning operators 112. For the purpose of illustration, the number of planning operators 112 may be denoted as N. The search space may be denoted as T. T may be in a range between 1 and N. Text optimization module 110 may start the iterative deepening depth-first search with a search space (e.g., T=1), which means to perform one planning operation applying each one of planning operators 112 to the initial text. Text optimization module 110 may find a candidate text after the planning operation by applying each one of planning operators 112 to modify the initial text. Text optimization module 110 may score the candidate text using a scoring function from evaluation module 114. Text optimization module 110 may determine whether the candidate text has a better score according to the scoring function. If text optimization module 110 determines that the candidate text has a better score than the initial text, text optimization module 110 may replace the initial text with the candidate text and repeat applying each one of planning operators 112 to modify the candidate text. If no better text is found in the search space (i.e., T=1), text optimization module 110 may increment T from 1 to 2 and apply the new T (i.e., T=2) planning operations based on planning operators 112 and repeat till finding a new better candidate text. Text optimization module 110 may repeat till T reaching to the maximum search space (i.e., N) and find the best candidate text based on the best score from the scoring function in evaluation module 114. Text optimization module 110 may output the best candidate text as output text 106. In one or more embodiments, text optimization module 110 may efficiently perform anytime (or real-time) heuristic search which can be terminated whenever a user wants. For example, the heuristic search may be terminated when a predefined threshold is met. The threshold can be predefined as a runtime of the iterative deepening depth-first search, a maximum number of the planning operators applied to input text 104, and or a predefined score of a target text (e.g., output text 106).

In step 206, text optimization module 110 evaluates a modified text of input text 104 using a scoring function. Text optimization module 110 may generate the modified text based on applying planning operators 112. Text optimization module 110 may evaluate the quality of the modified text of input text 104. Text optimization module 110 may evaluate the quality of the description of the modified text. Text optimization module 110 may generate a score for the modified text. The higher score indicates the better quality the modified text has. Text optimization module 110 may iteratively evaluate the modified text based on the iteratively applied planning operators 112 respectively.

In step 208, text optimization module 110 determines whether a score generated from the scoring function on the modified text is above a predefined threshold. Text optimization module 110 may evaluate a text, e.g., input text 104, any further modified text based on input text 104, and output text 104. Text optimization module 110 may evaluate the text using a scoring function and generate a score for the text. In general, a higher score indicates a better quality of the text. Text optimization module 110 may evaluate the quality of the text, for example, by evaluating a description of the text. Text optimization module 110 may generate a score for the evaluated text. Text optimization module 110 may iteratively evaluate the modified text based on the iteratively applied predefined planning operators 112 respectively. Text optimization module 110 may embody a scoring function by an automated essay scoring. Text optimization module 110 may evaluate the text in term of the text's structure. Text optimization module 110 may receive feedback from an end user and use the feedback to influence the output (e.g., a user can assign more weights on some examples and generate more facts from knowledge database 124).

In step 210, text optimization module 110 may output the modified text as output text 106. If text optimization module 110 determines that a score generated from the scoring function on the modified text is above a predefined threshold, text optimization module 110 may output the modified text as output text 106. In one or more embodiments, text optimization module 110 may optimize a translation using planning operators 112 at the discourse level. Text optimization module 110 may re-order sentences to a more reasonable and convincing order. Text optimization module 110 may remove sentences including redundant information. Text optimization module 110 may add detailed sentences/contents to clarify information uncommon to a reader. Text optimization module 110 may paraphrase sentences to be more understandable and effective. Text optimization module 110 may perform a post-processing step for discourse-level machine translation. Text optimization module 110 may optimize input text 104 in a structured way. Text optimization module 110 may add words and sentences which are not present in the initial description of input text 104. Text optimization module 110 may define the optimization task as a discourse-level planning task by defining planning operators 112. Text optimization module 110 may improve the quality of translations by applying planning operators 112 to input text 104 and further modified text in a description level. Text optimization module 110 may use a combination of plan execution and search. Text optimization module 110 may terminate the plan execution and search per a predefined threshold at any time per a user. After receiving an initial text, a set of predefined operators, a scoring function and commonsense knowledge database as input, text optimization module 110 may output an optimized text (e.g., output text 106) in a target language.

Figure 3:
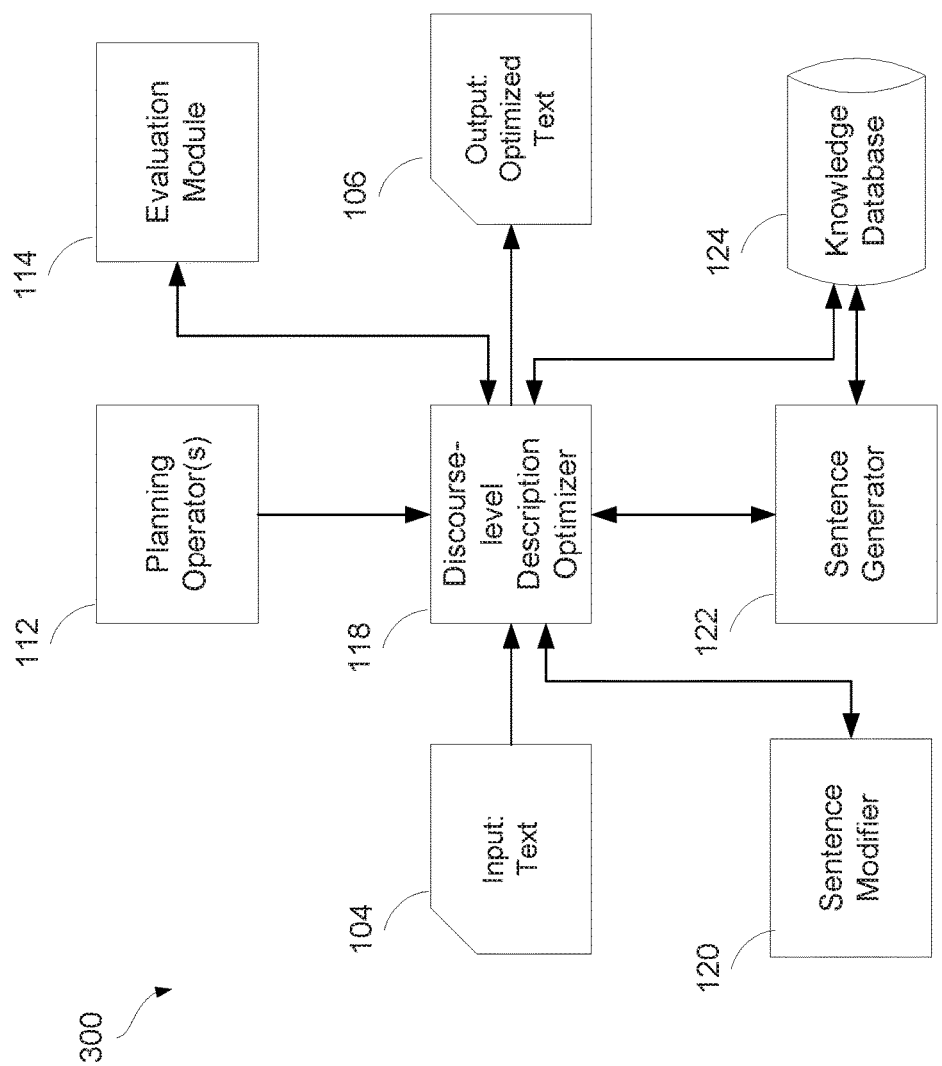
FIG. 3 illustrates an exemplary functional diagram of the text optimization module within the computing device of FIG. 1, in accordance with an embodiment of the present disclosure.

FIG. 3 illustrates an exemplary functional diagram 300 of text optimization module 110 in accordance with one or more embodiments of the present disclosure.

In the example of FIG. 3, text optimization module 110 includes discourse-level description optimizer 118. Discourse-level description optimizer 118 receives input text 104 as an initial text. Discourse-level description optimizer 118 applies planning operators 112 to modify input text 104. Planning operators 112 may be a set of predefined planning operations to perform in input text 104. Planning operators 112 may define swapping, adding, removing, paraphrasing, or other operations in a sentence level. Discourse-level description optimizer 118 may apply a heuristic search to find a sequence of planning operators 112 applied to input text 104 for a new text which returns a better score according to a scoring function. Discourse-level description optimizer 118 may apply an iterative deepening depth-first search based on the sequence of planning operators 112. Discourse-level description optimizer 118 may iteratively apply planning operators 112 to modify input text 104. Discourse-level description optimizer 118 may score the candidate text using a scoring function from evaluation module 114. Discourse-level description optimizer 118 may determine whether the candidate text has a better score according to the scoring function. If discourse-level description optimizer 118 determines that the candidate text has a better score than the initial text, discourse-level description optimizer 118 may replace the initial text with the candidate text and repeat applying each one of planning operators 112 to modify the candidate text. Discourse-level description optimizer 118 may use sentence modifier 120 to modify a sentence in a text, e.g., input text 104.

Discourse-level description optimizer 118 may use sentence modifier 120 to paraphrase a sentence in input text 104. For example, sentence modifier 120 may modify the sentence through a writing tool using artificial intelligence and natural language processing techniques. Sentence modifier 120 may modify a sentence based on knowledge database 124. Discourse-level description optimizer 118 may generate a new sentence using sentence generator 122. Sentence generator 122 may generated a new sentence based on knowledge database 124. For example, sentence generator 122 may find a single/plural of relevant keywords from knowledge database 124 and pass the keywords to a language model for a sentence generation. Sentence generator 122 may insert a new sentence in input text 104 based on applying planning operator 112. Knowledge database 124 may be structured and/or unstructured existing documents (e.g., academic papers, documents from the Internet). Sentence generator 122 may generated a new sentence based on knowledge database 124. Sentence modifier 120 may paraphrase a sentence based on knowledge database 124. Discourse-level description optimizer 118 may output the best candidate text as output text 106.

Figure 4:
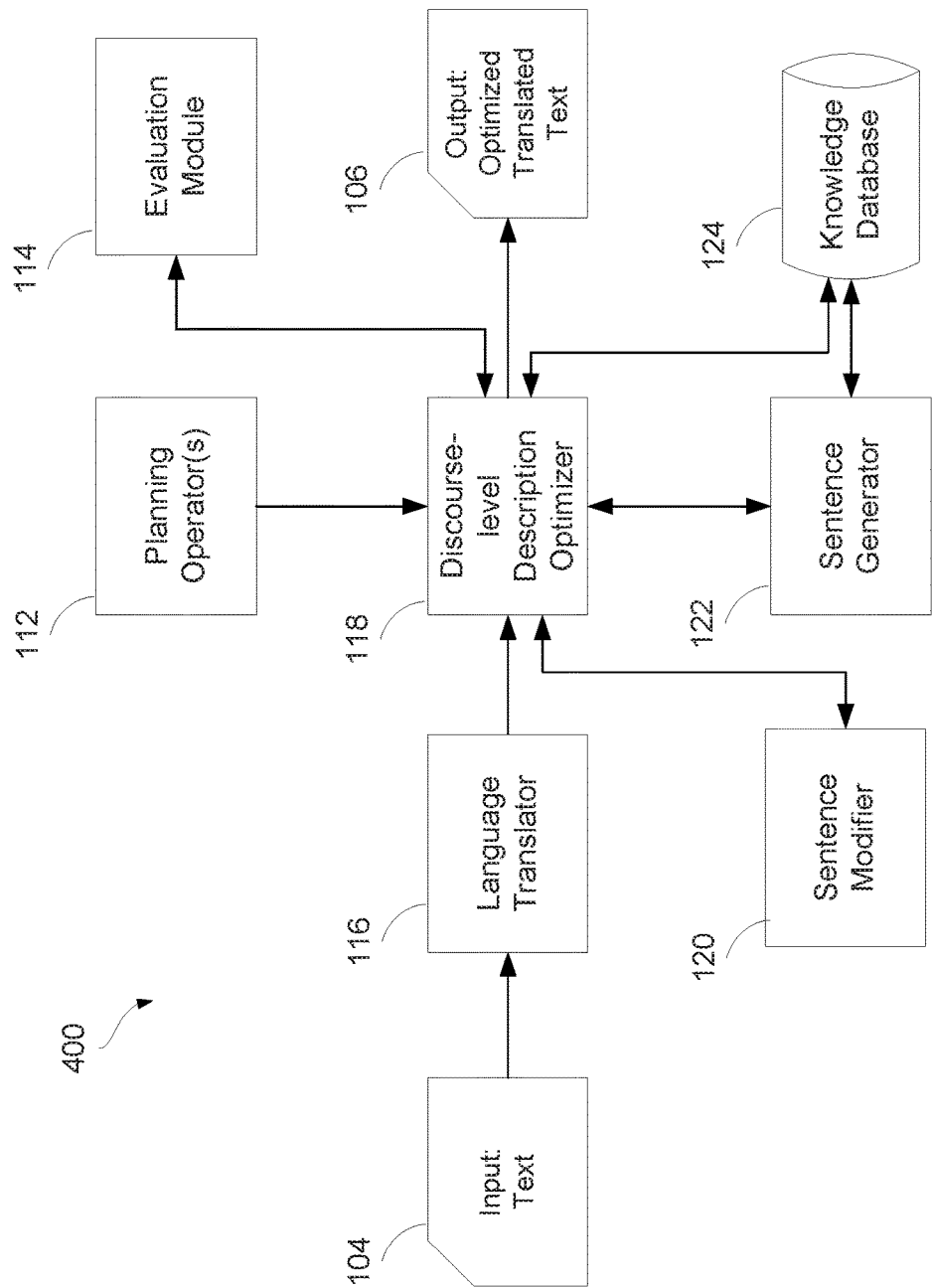
FIG. 4 illustrates another exemplary functional diagram of the text optimization module within the computing device of FIG. 1, in accordance with an embodiment of the present disclosure.

FIG. 4 illustrates an exemplary functional diagram of text optimization module 110 in accordance with one or more embodiments of the present disclosure.

In the example of FIG. 4, text optimization module 110 includes language translator 116. Language translator 116 may translate input text 104 in a natural language into a different language. In an example, language translator 116 may be a sentence-level natural language processing translation engine to translate input text 104 into a different natural language. Language translator 116 may translate a text sentence by sentence. In another example, language translator 116 may be a phrase-based translator. Discourse-level description optimizer 118 may receive a translated text of input text 104. Discourse-level description optimizer 118 may perform a post-processing step for discourse-level machine translation. Discourse-level description optimizer 118 may optimize the translated text using planning operators 112 at the discourse level. Discourse-level description optimizer 118 may output an optimized translated text (e.g., output text 106) in a target language.

Figure 5:
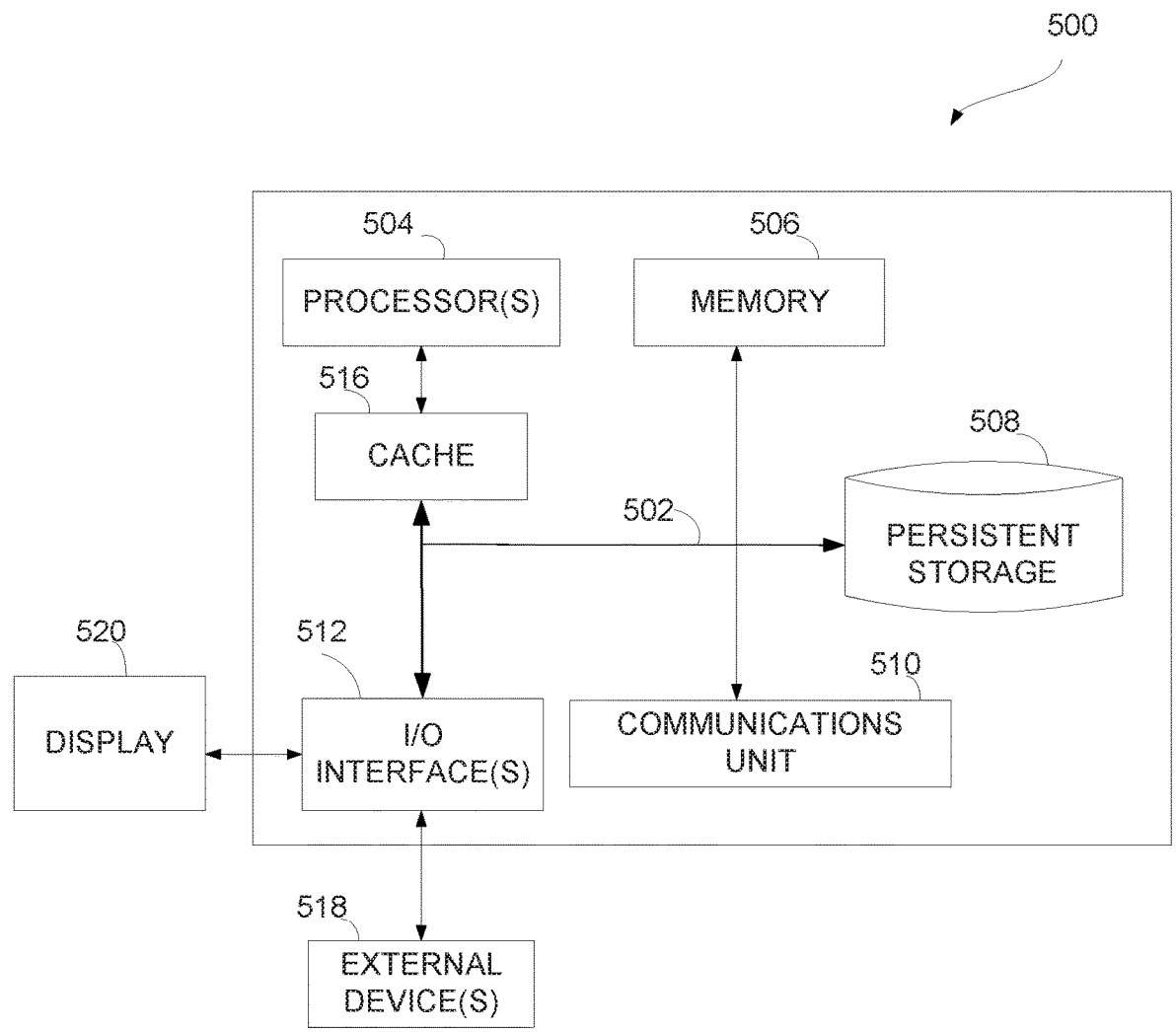
FIG. 5 is a block diagram of components of the computing device of FIG. 1, in accordance with an embodiment of the present disclosure.

FIG. 5 depicts a block diagram 500 of components of computing device 102 in accordance with an illustrative embodiment of the present disclosure. It should be appreciated that FIG. 5 provides only an illustration of one implementation and does not imply any limitations with regard to the environments in which different embodiments may be implemented. Many modifications to the depicted environment may be made.

Computing device 102 may include communications fabric 502, which provides communications between cache 516, memory 506, persistent storage 508, communications unit 510, and input/output (I/O) interface(s) 512. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses or a crossbar switch.

Memory 506 and persistent storage 508 are computer readable storage media. In this embodiment, memory 506 includes random access memory (RAM). In general, memory 506 can include any suitable volatile or non-volatile computer readable storage media. Cache 516 is a fast memory that enhances the performance of computer processor(s) 504 by holding recently accessed data, and data near accessed data, from memory 506.

Text optimization module 110 may be stored in persistent storage 508 and in memory 506 for execution by one or more of the respective computer processors 504 via cache 516. In an embodiment, persistent storage 508 includes a magnetic hard disk drive. Alternatively, or in addition to a magnetic hard disk drive, persistent storage 508 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer readable storage medium that is also part of persistent storage 508.

Communications unit 510, in these examples, provides for communications with other data processing systems or devices. In these examples, communications unit 510 includes one or more network interface cards. Communications unit 510 may provide communications through the use of either or both physical and wireless communications links. Text optimization module 110 may be downloaded to persistent storage 508 through communications unit 510.

I/O interface(s) 512 allows for input and output of data with other devices that may be connected to computing device 102. For example, I/O interface 512 may provide a connection to external devices 518 such as a keyboard, keypad, a touch screen, and/or some other suitable input device. External devices 518 can also include portable computer readable storage media such as, for example, thumb drives, portable optical or magnetic disks, and memory cards. Software and data used to practice embodiments of the present invention, e.g., text optimization module 110 can be stored on such portable computer readable storage media and can be loaded onto persistent storage 508 via I/O interface(s) 512. I/O interface(s) 512 also connect to display 520.

Display 520 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Python, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A computer-implemented method comprising:
    receiving, by one or more processors, an initial text in a first language;
    applying, by one or more processors, one or more operators to modify the initial text, wherein the initial text is modified based on a candidate text;
    evaluating, by one or more processors, the modified text using a scoring function, wherein evaluating is based on applying one or more user assigned weights associated with one or more example modified texts;
    generating one or more facts from a knowledge database using the one or more user assigned weights;
    determining, by one or more processors, whether a score generated from the scoring function on the modified text is above a predefined threshold, wherein the predefined threshold includes a runtime of an iterative deepening depth-first search, a maximum number of planning operators applied to the initial text, and a score of a target text; and
    in response to determining the score is above the predefined threshold, outputting, by one or more processors, the modified text.

2. The computer-implemented method of claim 1, wherein applying the one or more operators comprises applying a heuristic search to find a sequence of the one or more operators applied to the initial text for a new text which returns a better score according to the scoring function.

3. The computer-implemented method of claim 2, wherein applying the one or more operators comprises applying an iterative deepening depth-first search based on the sequence of the one or more operators.

4. The computer-implemented method of claim 2, wherein applying the one or more operators comprises applying iteratively the one or more predefined operators to modify the initial text.

5. The computer-implemented method of claim 4, wherein evaluating the modified text comprises evaluating iteratively the modified text based on the iteratively applied one or more predefined operators respectively.

6. The computer-implemented method of claim 1, further comprising:
    translating, by one or more processors, the initial text into a second language;
    generating, by one or more processors, a new sentence in the translated text;
    paraphrasing, by one or more processors, an existing sentence in the translated text; and
    outputting, by one or more processors, the translated text in the second language.

7. The computer-implemented method of claim 1, further comprising:
    identifying a portion of text from the initial text;
    generating a similar text, wherein the similar text is similar to the portion of text; and
    replacing the portion of text from the initial text with the similar text.

8. The computer-implemented method of claim 1, further comprising:
    identifying, by one or more processors, a portion of text from the initial text;
    generating, by one or more processors, one or more additional similar texts, wherein the one or more additional similar texts are similar to the portion of text;
    storing, by one or more processors, the one or more additional similar texts in a hash table;
    analyzing, by one or more processors, the hash table to detect one or more duplicates of the one or more additional similar texts;
    identifying, by one or more processors, an optimized text from the one or more additional similar texts; and
    replacing, by one or more processors, the portion of text in the initial text with the optimized text.

9. A computer program product comprising:
    one or more computer readable storage media, and program instructions collectively stored on the one or more computer readable storage media, the program instructions comprising:
    program instructions to receive an initial text in a first language;
    program instructions to apply one or more operators to modify the initial text, wherein the initial text is modified based on a candidate text;
    program instructions to evaluate the modified text using a scoring function, wherein evaluating is based on applying one or more user assigned weights associated with one or more example modified texts;
    program instructions to generate one or more facts from a knowledge database;
    program instructions to determine whether a score generated from the scoring function on the modified text is above a predefined threshold, wherein the predefined threshold includes a runtime of an iterative deepening depth-first search, a maximum number of planning operators applied to the initial text, and a score of a target text; and
    program instructions to, in response to determining the score is above the predefined threshold, output the modified text.

10. The computer program product of claim 9, wherein program instructions to apply the one or more operators comprise program instructions to apply a heuristic search to find a sequence of the one or more operators applied to the initial text for a new text which returns a better score according to the scoring function.

11. The computer program product of claim 10, wherein program instructions to apply the one or more operators comprise program instructions to apply an iterative deepening depth-first search based on the sequence of the one or more operators.

12. The computer program product of claim 10, wherein program instructions to apply the one or more operators comprise program instructions to apply iteratively the one or more predefined operators to modify the initial text.

13. The computer program product of claim 12, wherein program instructions to evaluate the modified text comprise program instructions to evaluate iteratively the modified text based on the iteratively applied one or more predefined operators respectively.

14. The computer program product of claim 9, further comprising:
    program instructions, stored on the one or more computer-readable storage media, to translate the initial text into a second language;

program instructions, stored on the one or more computer-readable storage media, to generate a new sentence in the translated text;

program instructions, stored on the one or more computer-readable storage media, to paraphrase an existing sentence in the translated text; and program instructions, stored on the one or more computer-readable storage media, to output the translated text in the second language.

15. A computer system comprising:

one or more computer processors, one or more computer readable storage media, and program instructions stored on the one or more computer readable storage media for execution by at least one of the one or more computer processors, the program instructions comprising:

program instructions to receive an initial text in a first language;

program instructions to apply one or more operators to modify the initial text, wherein the initial text is modified based on a candidate text;

program instructions to evaluate the modified text using a scoring function, wherein evaluating is based on applying one or more user assigned weights associated with one or more example modified texts;

program instructions to generate one or more facts from a knowledge database;

program instructions to determine whether a score generated from the scoring function on the modified text is above a predefined threshold, wherein the predefined threshold includes a runtime of an iterative deepening depth-first search, a maximum number of the planning operators applied to the initial text, and a score of a target text; and program instructions to, in response to determining the score is above the predefined threshold, output the modified text.

16. The computer system of claim 15, wherein program instructions to apply the one or more operators comprise program instructions to apply a heuristic search to find a sequence of the one or more operators applied to the initial text for a new text which returns a better score according to the scoring function.

17. The computer system of claim 16, wherein program instructions to apply the one or more operators comprise program instructions to apply an iterative deepening depth-first search based on the sequence of the one or more operators.

18. The computer system of claim 16, wherein program instructions to apply the one or more operators comprise program instructions to apply iteratively the one or more predefined operators to modify the initial text.

19. The computer system of claim 18, wherein program instructions to evaluate the modified text comprise program instructions to evaluate iteratively the modified text based on the iteratively applied one or more predefined operators respectively.

20. The computer system of claim 15, further comprising:

program instructions, stored on the one or more computer-readable storage media, to translate the initial text into a second language;

program instructions, stored on the one or more computer-readable storage media, to generate a new sentence in the translated text;

program instructions, stored on the one or more computer-readable storage media, to paraphrase an existing sentence in the translated text; and program instructions, stored on the one or more computer-readable storage media, to output the translated text in the second language.

* * * * *